Dec. 5, 1961
J. P. HEISS ET AL
3,011,595
SAFETY BRAKE SYSTEM
Filed June 22, 1955
4 Sheets-Sheet 4
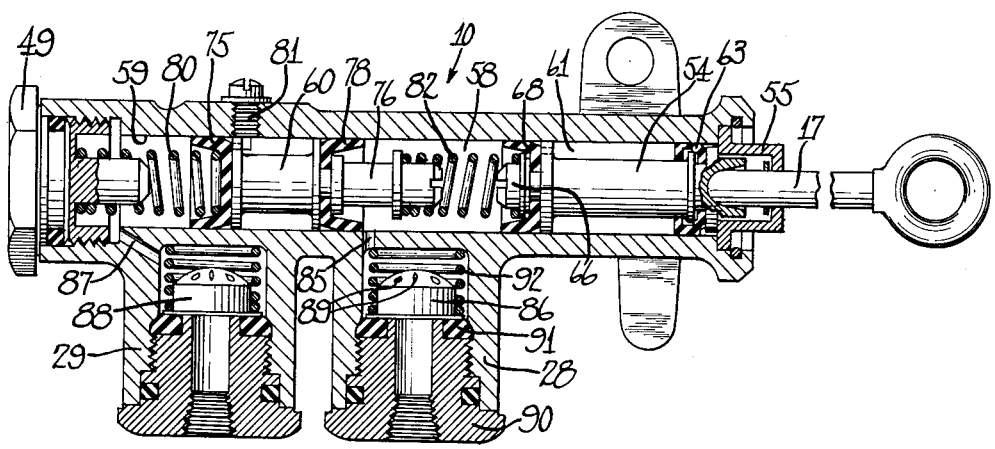
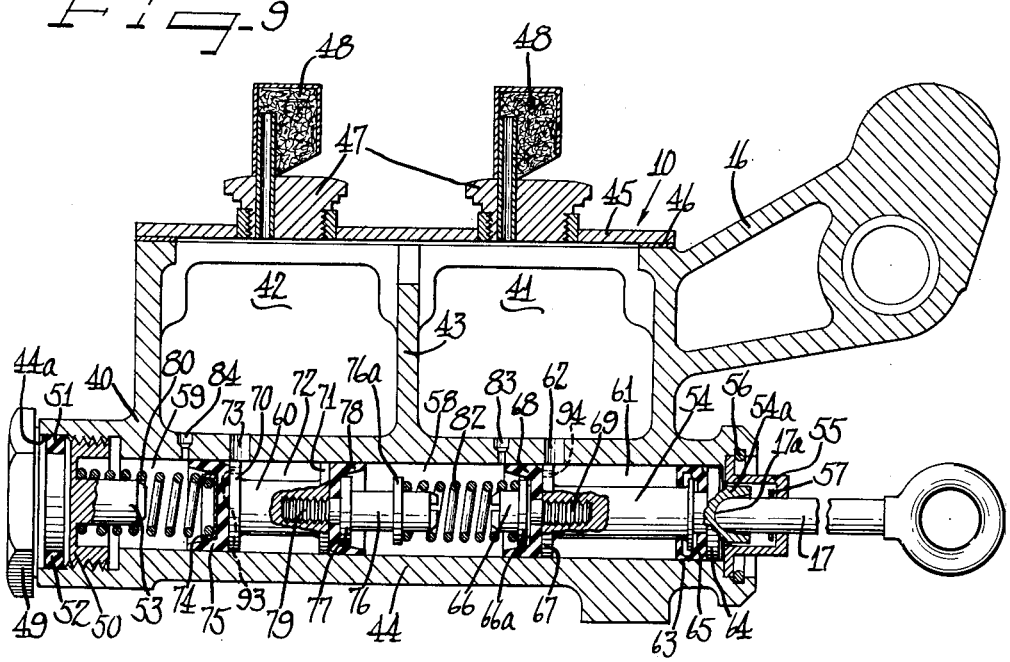
Inventors
John P. Heiss
Richard L. Gates
by Hill, Sherman, Meroni, Gross & Simpson Attys United States Patent Office 3,011,595
Patented Dec. 5, 1961

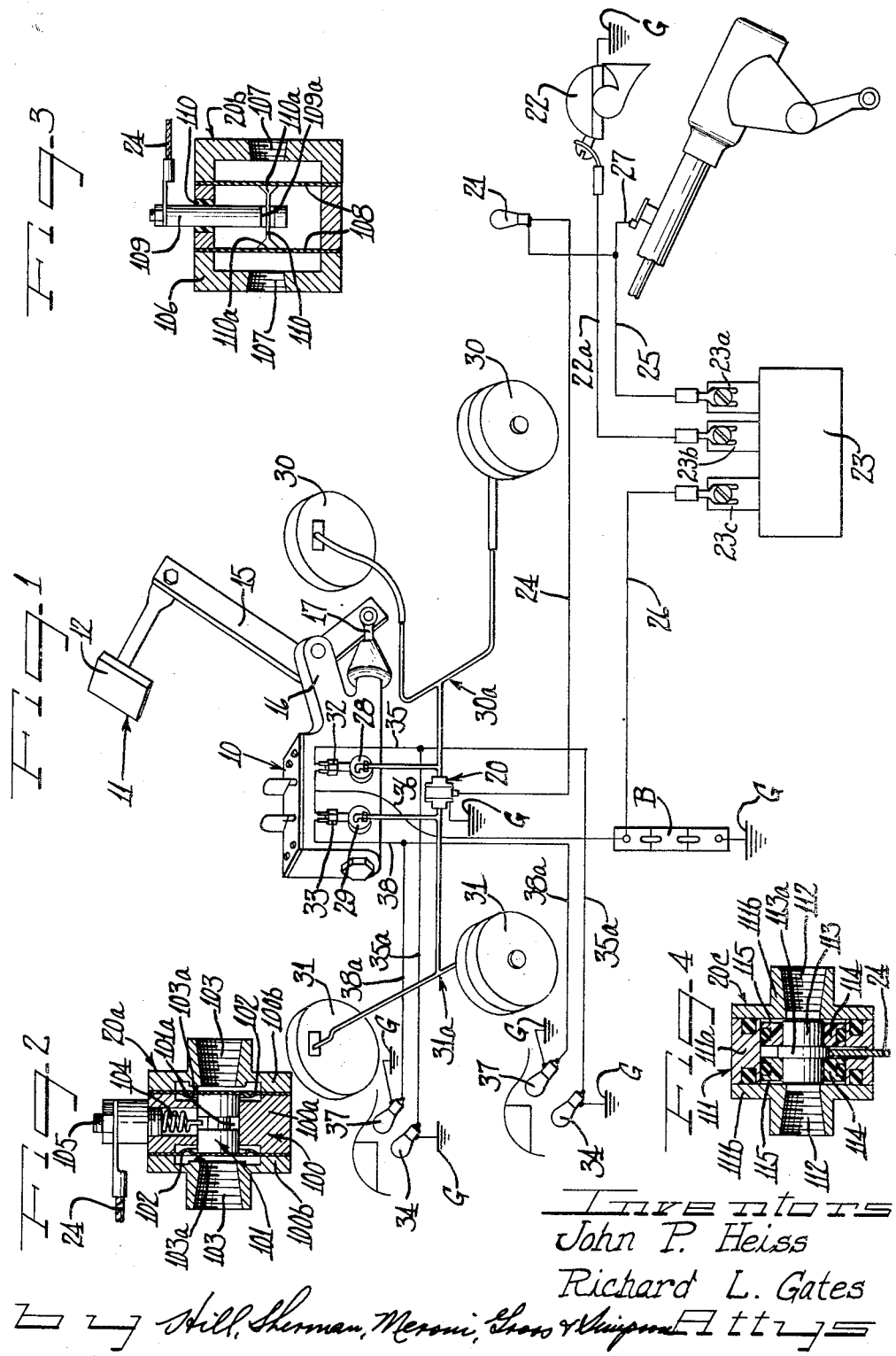

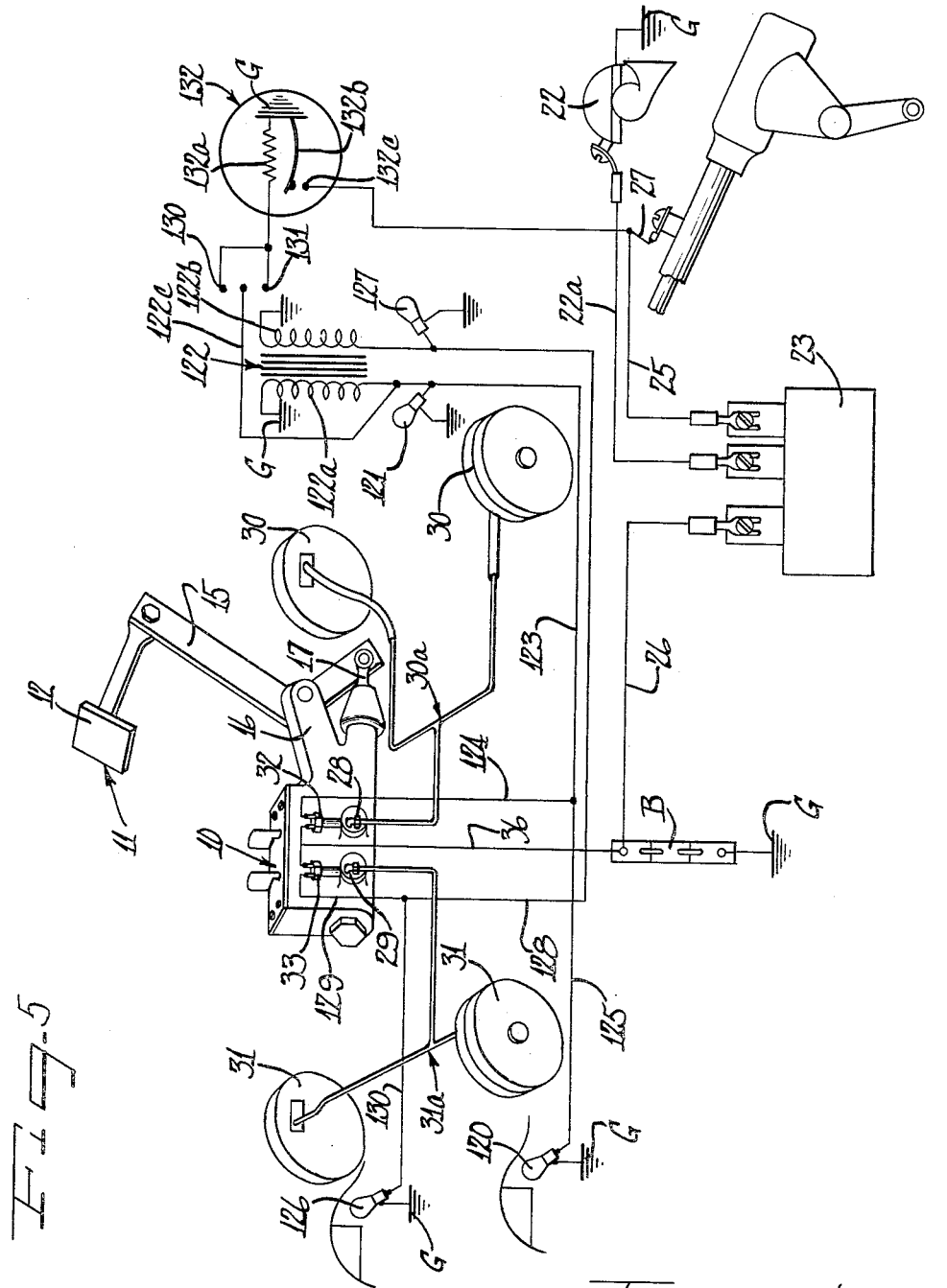

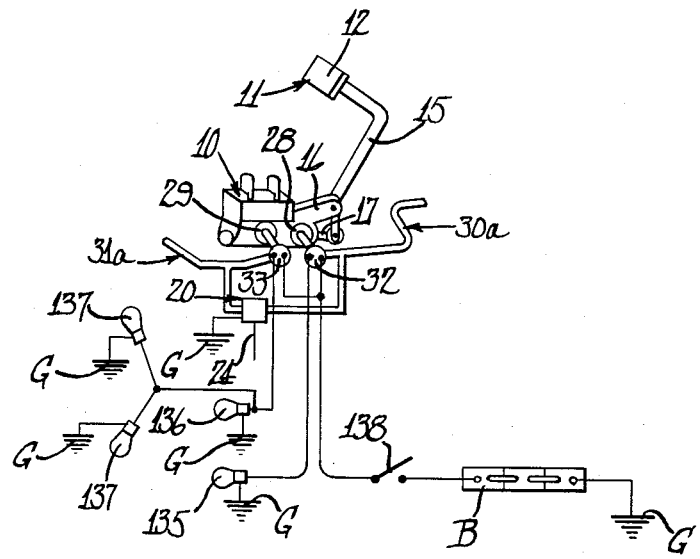

3,011,595
SAFETY BRAKE SYSTEM
John P. Heiss, Flint, Mich., and Richard L. Gates, Cleveland, Ohio, assignors to Thompson Ramo Wooldridge Inc., a corporation of Ohio
Filed June 22, 1955, Ser. No. 517,142
2 Claims. (Cl. 188—1)

This invention relates to improvements in hydraulic controlling systems, such as may be used in connection with vehicle brakes or hydraulic controlling mechanisms generally, and more particularly to safety brake systems including means for detecting failure of the front or rear wheel brakes, although the invention may have other uses and purposes apparent to one skilled in the art.

The present invention deals with hydraulic safety brake systems and the like having a dual master cylinder with twin hydraulic working chambers. One of the working chambers is in line connected to the front wheel brakes, while the other working chamber is line connected to the rear wheel brakes. A balanced signal switch is responsive to a pressure differential existing between the front and rear brake lines which would obviously indicate brake failure in one of the lines. The signal switch can be either hydraulic or electrical. Actuation of the switch relays a signal to a sound warning device or a light warning device, or both, to inform the operator of brake failure. Stop or tail lights are operated by line mounted hydraulic switches or brake actuated mechanical switches. Failure of either the front or rear wheel brakes, due to inadequate hydraulic pressure in a corresponding line, creates a differential between the lines which actuates the balanced signal switch. The signal switch then operates a sound warning device, such as a horn or the like, or a warning light, or both.

In the preferred embodiment of the invention, a hydraulic balanced signal switch is employed which, upon detecting a pressure differential between the front and rear brake lines, operates a warning light and a horn. Dual hydraulic brake switches are connected to the front and rear brakes lines to actuate dual stop lights. Two bulbs are provided in each stop light, to be separately actuated or energized by the hydraulic switches. Thus, neither switch nor bulb failure will impair stop light functions.

The hydraulic balanced signal switch may be of any suitable type having a slidable piston, diaphragms, or other equivalent means.

In another embodiment of the invention, dual dash warning lights are provided operating off the separate hydraulic switches, while only a single bulb in each tail light is operated by one of the hydraulic switches.

In still another embodiment of the invention, a single bulb in each stop light is independently actuated by either the forward or rear hydraulic switch. An electrical balanced signal switch is provided, which becomes unbalanced upon the failure of the front or rear wheel brakes, and energizes a heater delay relay which operates a sound warning device, such as a horn.

Another embodiment differs from the last mentioned arrangement in employing mechanical switches directly associated with the front and rear wheel brakes in place of the hydraulic switches in the hydraulic lines.

Accordingly, it is an object of this invention to provide an improved safety brake system for vehicles and the like.

A further object of this invention is to provide a hydraulic safety brake system for vehicles and the like employing a tandem master cylinder wherein failure of one of the master cylinders or associated wheel cylinders will not disturb the function of the other master cylinder and associated wheel cylinders.

A still further object of this invention resides in the provision of a hydraulic safety brake system for vehicles and the like having a tandem master cylinder, wherein one of the master cylinders operates the front wheel brakes and the other master cylinder operates the rear wheel brakes, and a balanced signal switch is provided to detect a failure in the front or rear wheel brakes and sound an alarm or warning device.

Still another object of this invention is to provide a hydraulic safety brake system having a dual master cylinder for separately operating the front wheel brakes and the rear wheel brakes and means for readily determining a failure of front or rear wheel brake operation.

A further feature of the invention is in the provision of a safety brake system employing a dual master cylinder for separate operation of the front wheel brakes and the rear wheel brakes, wherein the hydraulic balanced signal switch is connected between the front and rear brake lines to detect a hydraulic pressure differential which would indicate front or rear wheel brake failure and to operate a warning device.

A still further object of this invention is to provide a hydraulic safety brake system employing a dual master cylinder for separately operating the front and rear wheel brakes, wherein an electrical balanced signal switch is actuated from front and rear hydraulic switches during a brake failure to operate a warning device.

Another feature of this invention is to provide a safety brake system for vehicles and the like employing a dual master cylinder separately operating the front and rear wheel brakes, and a separate hydraulic switch associated with each master cylinder for individually operating dual stop lights, wherein failure of one hydraulic switch will not impair the operation of one stop light.

A further object of this invention is to provide a hydraulic safety brake system for vehicles and the like comprising a dual master cylinder for separately operating the front and rear wheel brakes, dual hydraulic switches in the front and rear brake lines for operating dual stop lights, wherein a pair of bulbs is provided in each stop light to be separately operated by each hydraulic switch thereby greatly enhancing stop light functions.

A further feature of this invention is to provide a hydraulic safety brake system for vehicles and the like employing a tandem master cylinder for separately operating the front wheel brakes and the rear wheel brakes, wherein a balanced signal switch is provided to be actuated by mechanical switches directly associated with a front wheel brake and a rear wheel brake.

Other objects, features and advantages of the invention will be apparent from the following disclosure, taken in conjunction with accompanying sheets of drawings, which, by way of preferred examples, illustrate several embodiments of the invention, and wherein like reference numerals refer to like parts, in which:

On the drawings—

FIGURE 1 is a diagrammatic view of a safety brake system, illustrating the preferred embodiment of the invention employing a hydraulic balanced signal switch;

FIGURE 2 is an axial sectional view, with parts in elevation, illustrating one form of a hydraulic balanced signal switch;

FIGURE 3 is an axial sectional view, with parts in elevation, illustrating another form of a hydraulic balanced signal switch;

FIGURE 4 is an axial sectional view, with parts in elevation, illustrating still another form of a hydraulic balanced signal switch;

FIGURE 5 is a diagrammatic view of a safety brake system, illustrating another embodiment of the invention and employing an electrical balanced signal switch;

FIGURE 6 is a diagrammatic view of a safety brake system, partly fragmentary, illustrating still another embodiment of the invention and employing a hydraulic balanced signal switch;

FIGURE 7 is a diagrammatic view of a safety brake system illustrating still another embodiment of the invention, being quite similar to the embodiment of FIGURE 5, but employing mechanical brake actuated switches rather than the hydraulic brake actuated switches;

FIGURE 8 is an enlarged axial sectional view, with parts in top plan view, of the working cylinders of the tandem master cylinder employed in the invention; and FIGURE 9 is an axial sectional view, with some parts shown in elevation, of the tandem master cylinder shown in FIGURE 8.

As shown on the drawings—

Referring to FIGURE 1, a safety brake system illustrating the preferred embodiment of this invention, includes generally a tandem or dual master cylinder generally indicated by the numeral 10, a manually operable foot pedal 11 for actuating the master cylinder, and an electrical circuit for warning of defective brakes and operation of stop or tail lights.

The master cylinder foot operated control 11 includes a foot pedal 12 connected to an actuating lever 15 having a long upwardly and laterally extending portion connected to the foot pedal 12 and a short downwardly extended portion angularly related to the upper portion, being carried for oscillating movement on a forwardly projecting pivot support 16 of the master cylinder 10. The free end of the lower portion of link 15 is pivotally connected by a pin or other suitable means to a push rod 17 of the master cylinder 10. It is seen that downward pressure of the foot pedal 12 will cause the actuating lever 15 to pivot around support 16 and force the push rod 17 inwardly to energize the master cylinder 10.

Actuation of the tandem master cylinder 10 would force fluid under pressure to a primary outlet port 28 and a secondary outlet port 29, to operate a pair of wheel cylinders in a pair of front wheel brake assemblies 30, 30 and a pair of wheel cylinders of a pair of rear wheel brake assemblies 31, 31, respectively, through correspondingly appropriate conduits and piping indicated generally by the numerals 30a and 31a, respectively.

A pair of pressure responsive hydraulic switches 32 and 33 are respectively actuated by the fluid pressures built up in the primary and secondary cylinder ports 28 and 29. Actuation of the switch 32 energizes a pair of parallel connected bulbs 34, 34, one in each of a pair of tail or stop lights. The switch 32 is connected on one side to the bulbs through a conductor 35 having branches 35a, 35a connecting directly to each bulb 34, and on the other side through a common conductor 36 to a battery B of the vehicle. The battery B and the bulbs 34 are connected to a common ground G to complete the circuit. The hydraulic switch 33, upon actuation energizes a pair of bulbs 37, 37 one in each of the tail lights, and is connected on one side through a conductor or line 38 having branches 38a, 38a to the bulbs 37 and on the other side through the common conductor 36 to the battery B. The bulbs 37 are also grounded by grounds G to complete the circuit through the battery B.

Thus, it is seen that this tail light arrangement greatly enhances the safety of a vehicle equipped with same since failure of one of the hydraulic switches or one of the bulbs will not impair stop light functions.

A safety device in the form of a hydraulic balanced signal switch, generally indicated by the numeral 20 is provided to energize a signal such as a horn, a light, a buzzer or the like, whenever an unbalanced or differential condition exists between the fluid pressure in the front and rear brakes. Thus, the safety device warns the vehicle operator that brake failure has occurred in either the front or rear brake systems.

The balanced signal switch 20 is connected to the front and rear brake systems to subject the switch to the front and rear brake fluid pressures.

When an unbalanced condition exists between the front and rear brake system, indicating brake failure, the closing of switch 20 energizes a dash warning light 21 and a sound warning device of any type, and in this case a conventional horn 22 of the vehicle. In other words, the safety switch 20 may be wired into the horn circuit of the automobile or vehicle. Actually, the closing of switch 20 energizes the dash light 21 and the horn relay 23, and the horn relay, in turn, energizes the horn 22.

The switch 20 is connected to a terminal 23a of the horn relay 23 through a conductor 24, the light 21 and a conductor 25. A conductor 22a connects a terminal 23b of the horn relay to the horn 22, while a conductor 26 connects a terminal 23c of the horn relay 23 to the vehicle battery B. A conductor 27 leads from the conductor 25 to a conventional horn button of the vehicle mounted on a steering assembly.

When the switch 20 is closed, the light 21 is connected in series through terminals 23a and 23c of the relay across the battery. The light is immediately energized and after the relay contact is closed, between the terminals 23b and 23c, the horn is energized. When only the horn button is closed, in normal horn operation, the relay terminals 23a and 23c are directly across the battery and the light is not energized. Thus the safety switch and warning light are wired into the conventional horn circuit of the automobile without impairing the normal operation of the horn.

Although the specific construction of the master cylinder 10 alone forms no part of this invention, it will be described to present a more complete disclosure with associated parts embodied therewith. Referring now to FIGURES 8 and 9, the tandem master cylinder is constructed primarily of a main casting 40 of any suitable material which comprises twin reservoirs 41 and 42 axially aligned and separated by a dam or partitioning wall 43, said reservoirs overlying a cylinder 44. Communication between the reservoirs is had through an opening provided at the top of the dam. An assembly cover 45 encloses the top of the reservoirs 41 and 42, being suitably fastened thereover by any known means in sealing engagement with a gasket 46, and suitable top plugs 47, 47 disposed in the assembly cover 45 provide access to the reservoirs 41 and 42 for filling or other purposes. The top plugs 47, 47 are fitted with breathing tubes and filtering assemblies which serve to admit air into the reservoir as the supply of fluid declines. A filtering element, such as steel wool, as indicated by numeral 48, may be packed in the filtering assembly to exclude dust and foreign matter from the reservoirs.

The tandem master cylinder is adapted for feeding two independent hydraulic circuits, for example, as in this case, the brakes on the two front wheels and the brakes on the two rear wheels of a motor vehicle, which receive the hydraulic fluid under pressure from the outlet ports 28 and 29.

The cylinder barrel 44 forms the main body of the master cylinder, and is closed at the head end by a plug 49 threadedly secured thereto as indicated at 50. An annular groove 51 is provided near the outer end of the plug for receiving a resiliently constructed sealing ring 52. The ring 52 is preferably made of rubber, or like material, either a split or continuous ring, but preferably of circular cross section. The outside diameter of the sealing ring 52 is sized greater than the inside diameter of the cylinder end 44a to provide an air-tight fit between the cylinder and the plug. The bottom of the plug or the inner end is an annular hollow forming a spring pocket, a spring guide, and a protruding and abutting rod 53, the purpose of which will be hereinafter explained.

At the other end of the cylinder barrel 44 or the rear end, a primary piston 54 is arranged to be actuated by the actuating lever 15 (see FIG. 1) through the medium of a push rod 17 having an inner rounded end 17a adapted to engage a complementary socket 54a of the piston 54. A cup-shaped retainer 55 laterally flanged along its open end, is received within the rear open end of the barrel 44 seating against a shoulder and is held in place by a snap ring 56. The bottom wall of the member 55 is centrally apertured to receive the push rod 17 and cooperates with a removable snap ring 57 on said rod to maintain it in engagement with the primary piston 54.

Work is performed in chambers 58 and 59 by the axial movement of primary piston 54 and secondary piston 60, and the secondary piston 60 may be considered as a floating piston, since in normal operation, its protracting movement is not predicated on any mechanical links or levers. The intermediate portion of piston 54 is of reduced diameter providing an annular chamber 61 of such length as to always be in constant communication with passage 62 leading into the fluid reservoir 41 and thus forming a fluid sealing around the piston. Carried at the rear end of piston 54 is a flexible packing ring 63, preferably of rubber, for preventing the passage of fluid therebeyond and being held in place by flanges 64 and 65. The end flange 64 is sized to slidably engage the inner cylinder wall of the barrel 44 and cooperates with the retainer member 55 in preventing the piston 54 from being withdrawn from the cylinder. A forwardly extending axial abutment member 66 carrying a flanged portion 66a coacts with the inner cylinder engaging flange 67 of the piston 54 to grip the leading packing cup 68. The abutment member 66 carries at its inner end a reduced threaded portion adapted to be received by the piston 54 as indicated at 69.

Spaced axially ahead of the primary piston 54 is the floating piston 60, which carries at its opposite end cylinder engaging flanges 70 and 71 and intermediately thereof a reduced portion providing an annular chamber 72 of such length as to always be in communication with passage 73 leading into the fluid reservoir 42 thereby providing a fluid seal around the piston 60. By suitable fastening means, a retainer 74 secures a flexible packing cup 75 to the forward flange 70 of piston 60, while a rearwardly extending axial abutment member 76 carries a base flange 77 which coacts with the rear flange 71 of piston 60 to grip therebetween a rear packing cup 78. It is to be understood that all of the packing cups herein used are of a flexible or resilient material, preferably of a suitable rubber. The abutment member 76 carries near its base a threaded portion which is adapted to be received in the piston 60 as indicated at 79. The rear packing cup 78 on the piston 60 prevents the passage of fluid out of the working chamber 58 and thereby virtually constitutes a cylinder head of said chamber, and at the same time prevents the fluid from flowing to the chamber 58 from the annular chamber 72. A return spring 80, having one end surrounding the abutment 53 and seating against the hollow bottom of the plug 49 and the other end resting within the retaining member 74 of piston 60, generally maintains the floating piston 60 and particularly its flange 70 in abutting relation with stop screw 81 (FIG. 8) which limits the axial movement of the floating piston, and constantly urges the floating piston to its retracted position against the stop 81. In order to return the primary piston 54 to its retracted position, a spring 82 is provided in the working chamber 58 abutting at one end of the shoulder 66a of abutment 66 and at the other end a shoulder 76a of abutment 76. Since the predetermined spring strength of spring 80 is greater than that of spring 82, the force exerted by the former will always tend to move the floating piston 60 into its retracted position against the stop 81 without regard to the latter.

As noted in FIGURES 8 and 9, the abutments 66 and 76 are removable from their respective pistons, while the abutment 53 is removable with the plug 49, and these abutments may be interchangeable with others of different lengths for adjusting the maximum permissible displacement volume of each working chamber 58 and 59.

In the normal operation of the master cylinder, the working chambers 58 and 59, and the annular chambers 61 and 72 are completely filled with fluid from the reservoids 41 and 42, respectively, and when a force is applied to the push rod 17 the primary piston 54 is advanced along the cylinder barrel 44 so that the packing cup 68 first covers a breathing aperture 83 leading to the reservoir 41. Thereafter, fluid pressure is built up in the working chamber 58 and the hydraulic system associated therewith, thus actuating the front wheel cylinders and brakes in the instant invention, but this fluid pressure also acts upon the rear end of the floating piston 60, thus overcoming the comparatively slight pressure of the spring 80 and causing axial movement of said piston 60. After the breathing aperture 84 has been covered by the packing cup 75 of piston 60, pressure is built up in the working chamber 59, thus actuating, in the instant invention, the rear wheel cylinders and brakes, 31 and 31, connected to the secondary outlet port 29. Hence, it may be understood that during the normal use of the master cylinder, the pressure intensities in the working chambers 58 and 59 are approximately equal and are derived from the force exerted upon the push rod 17.

During the operation of the master cylinder the fluid from working chamber 58 passes through an aperture 85 in the cylinder wall of the barrel 44 through a two-way valve 86 disposed within the primary outlet portion 28, while the fluid from working chamber 59 is urged through a passageway 87 through a two-way valve 88, disposed within the secondary outlet port 29. Since the two-way valves 86 and 88 disposed within the ports 28 and 29, respectively, are identically arranged, only one will be described in detail.

The two-way valve 86 is hat-shaped having a rounded top with a plurality of small holes 89 therein, which are backed up on the inside by a flexibly retained rubber flap which allows the fluid to pass through the holes in a direction away from the cylinder, but prevents the fluid from passing back through the holes or openings 89 towards the master cylinder. A coupling member 90 is threadedly received within the outlet port 28, and carries on a reduced inner portion a resilient ring 91, which provides a valve seat for the hat-shaped valve 86. The brim of the hat-shaped valve 86 rests on the sealing ring 91, preferably made of rubber, and also provides a shoulder which abuts one end of the valve seating spring 92. The other end of the spring 92 contacts the outer cylinder wall of barrel 44. During the protractile stroke of the master cylinder the spring 92 will normally maintain the valve 86 in seated position as shown in FIGURE 8, while during the retractile stroke, the fluid will force the valve 86 from its seat against the force of the spring 92 to allow the fluid to return to the working chamber 58 and eventually to the reservoir 41. The strength of spring 92 is chosen to maintain a finite trapped residual line pressure for the purpose of keeping wheel cylinder cups engaged and, as a foot valve for recharging chambers 58 and 59. Also during the retractile stroke of the pistons in the master cylinder, the packing cups 75 and 68 will unseat from the flanges 70 and 67, respectively, uncovering in each flange an annular series of passages 93 and 94 in said flanges, respectively, thereby allowing the passage of fluid over said packing cups into the working chambers.

In case of failure in the hydraulic lines leading from the primary outlet port 28 or the wheel cylinders 30 communicating with said lines, wherein said failure is caused by leakage or loss of fluid, the fluid reservoir 41 would drain and empty into the working chamber 58, and there would be a substantially reduced resistance to contraction in the working chamber 58, so that the initial movement of the push rod 17 would be largely absorbed in the working chamber and the low pressure created therein would be insufficient to cause little if any movement of the floating piston 60. After the maximum prescribed contraction has taken place, this being determined by the sizes of the abutment members 66 and 76, the abutment member 66 would contact the abutment member 76 and apply a positive mechanical force to the floating piston 60 which would then displace fluid in the working chamber 59 and operate the brakes connected to the secondary outlet port 29.

Upon failure in the lines or wheel cylinders connected to the secondary outlet port 29, a similar action takes place, wherein the fluid reservoir 42 and working chamber 59 would lose the hydraulic fluid. Then any attempt to build up pressure within the first working chamber 58 would move the floating piston axially along the cylinder barrel 44 until the retainer 74 engages the abutment 53, whereafter further movement of the floating piston 60 is prevented so that subsequent protraction of the push rod 17 and piston 54 would build up the normal pressure within the working chamber 58 to displace fluid through the primary outlet port 29 and operate the front wheel brakes connected thereto.

The hydraulic balanced brake signal switch 20 may be of any desirable or suitable type such as illustrated in FIGURES 2, 3 and 4, and indicated by the numerals 20a, 20b and 20c, respectively.

Referring to FIGURE 2, the switch 20a includes a casing 100 and a floating piston 101 slidably mounted therein in close proximity between a pair of diaphragms 102, 102. The diaphragms 102 may be made of any suitable current conductive material such as a flexible metal and are held rigidly by the casing 100. The casing is provided with a pair of hydraulic fluid ports 103, 103 to communicate one of the diaphragms 102 with the brake fluid pressure of the front wheel brakes and to communicate the other diaphragm 102 with the brake fluid pressure of the rear wheel brakes. The diaphragms are dry on the piston side and thereby subjected to hydraulic pressure on the opposite sides.

Normally, the pressures between the front and rear brake systems are balanced and the piston 101 remains centralized due to the inherent stability of the diaphragms. A circular face 103a is provided inside the casing 100 around each port 103 to bottom the adjacent diaphragm 102 if either the front or rear brake system loses fluid pressure. Hence, if one side of the brake system should lose pressure, the piston will be forced to the end of its stroke and will bottom the corresponding diaphragm on the side without pressure or less pressure. It will be noted that since the stroke of the piston is limited, movement of the piston will not rupture the diaphragm having pressure.

The piston 101 carries an annular groove 101a at its middle which normally straddles a charged spring wire 104. The casing 100 includes a center section 100a constructed of any suitable insulating material, and a pair of metal, electric conductive end sections 100b, 100b. A threaded stud 105 is molded into the center section 100a to which the contact spring 104 is joined and by which it is electrically isolated. When the piston 101 moves to an unbalanced pressure condition, it contacts the spring wire 104 and closes the circuit between the wire 24 connected to the threaded stud 105 and one of the end housing sections 100b, both of which are grounded.

The diaphragms 102 are stiff enough so that a slight unbalanced pressure such as might occur in applying one brake system ahead of the other will not shift the piston 101 sufficient to close the circuit.

Another form of hydraulic balanced brake signal switch is shown in FIGURE 3 which includes a housing containing a casing 106 having oppositely disposed inlet ports 107, 107 for connecting to the front and rear brake system. A pair of opposed diaphragms 108, 108 are rigidly held in the casing 106, one to be subjected to the brake fluid pressure of the front brake system and the other to be subjected to the brake fluid pressure of the rear brake system. The diaphragms are preferably made of an electric conducting material, and are connected to ground through the casing 106. A charged electrode 109 is held by the casing and extends between the diaphragms 108. A ring of suitable insulating material 110 surrounds the electrode at the casing to insulate it therefrom. An aperture is provided in the free end of the electrode within the casing as indicated by the numeral 109a for freely receiving a contact member 110 that is joined to the opposite diaphragms 108 by enlarged end portions 110a.

Operation of the switch 20b is substantially identical with the operation of the switch 20a, wherein substantially equal pressure on each diaphragm 108 maintains the enlarged portions 110a of the member 110 out of engagement with the electrode 109. The diaphragms 108 are sufficiently stiff to prevent a slight unbalanced pressure condition from closing the circuit. When an unbalanced condition exists one of the enlarged portions 110a of the contacting member 110 engages the electrode 109 to complete the circuit between the charged wire 24 and the grounded casing 106.

The switch 20c of FIGURE 4 is similar to the form in FIGURE 2 and comprises a multi-sectioned casing 111 having a center cylindrical section 111a of insulated material, and a pair of end sections 111b, 111b of electric conducting material and being connected to ground.

Conventional O-rings are employed for sealing the adjacent faces of the center casing section 111a and the end casing sections 111b. Inlet ports 112, 112 are provided in the endhousing sections 111b for connection to the front and rear brake systems. A floating piston 113 is held in spaced relationship from the center casing section 111a by a pair of nylon rings 114, 114 that are axially spaced on the piston by a centrally disposed annular flange 113a. The nylon rings are grooved at their outer circumferential surface to receive conventional O-rings to seal the nylon rings against the bore of the center housing section 111a and prevent leakage of hydraulic fluid between the front and back brake systems. A pair of Belleville springs 115, 115 are interposed between the inner wall of each end casing section 111b and the adjacent nylon ring 114 to normally maintain the piston 113 and associated nylon rings centrally disposed between the end casing sections 111b.

Operation of switch 20c is substantially identical with the operation of switches 20a and 20b, wherein an unbalanced pressure condition causes the piston 113 to shift towards the lower pressure end of the switch and bottom on the adjacent end casing section 111b. The piston 113 in this case is charged by the wire 24 and bottoming on one of the casing end sections 111b closes the circuit to ground.

Should it be desired that the circuit remain closed once it is triggered, the Belleville springs 115 may be eliminated. It would then be necessary to require centering of the floating piston 113 at the time the vehicle is repaired for reason of hydraulic brake failure as the friction of the O rings would hold it in a closed circuit position.

Now referring to FIGURE 5, another embodiment, illustrating a safety brake system employs an electrical balanced signal switch in place of a hydraulic balanced signal switch, wherein like reference numerals refer to like parts.

In this embodiment, under normal conditions the actuation of the master cylinder 10, in turn, closes the contacts in hydraulic switches 32 and 33. Switch 32 then energizes a bulb 120 in one of the dual tail lights, a front dash warning light 121, and a right hand winding 122a on a balanced signal relay 122 having a common core. The right hand winding 122a and the warning light 121 are connected in series and to the hydraulic switch 32 by a conductor 123 and a conductor 124. The conductor 124 also connects with a conductor 125 to the tail light bulb 120. The tail light 120 and the coil winding 122a are grounded to complete the circuit through the ground of the battery B.

Actuation of the other hydraulic switch 33 similarly energizes a bulb 126 in the other tail light, a dash warning light 127 and a left hand winding 122b on the common core of the balance signal relay 122. The winding 122b and the light 127 are connected in series and connect to the hydraulic switch 33 through a conductor 128 and a conductor 129. The conductor 129 also connects the switch 33 to the bulb 126 of the tail light through a conductor 130. The switch 33 is also connected to the battery B through the common conductor 36, and to complete the circuit the tail light bulb 126 and the winding 122b are connected to the battery through the common ground G.

When the windings 122a and 122b are energized, the relay 122 will not be energized since the forces created by the oppositely wound coils cancel. However, due to brake failure in the front or rear brake systems, wherein the contacts in switch 32 are closed while the contacts in switch 33 are open, or vice versa, the relay 122 functions to urge the arm 122c against a contact 130 or a contact 131 to energize a heating element 132a in a bi-metal delay relay 132. The delay relay 132 is employed since momentarily as the brakes are applied the pressures may be unbalanced to cause actuation of one of the hydraulic switches 32 or 33 before the other which would close the warning circuit to energize the horn 22. The heater delay relay 132 may be of a conventional type that is commercially available and enclosed in a vacuum tube. A bi-metal contactor arm 132b will straighten and engage contact 132c to close the horn relay circuit upon sufficient heating by the heating element 132a. The contactor 132b closes depending upon calibration with a 1 second to a 30 second delay, but in this case a 5 second delay would be preferable. Thus, failure of pressure in the front or rear brake system causes corresponding failure of one tail light and one dash warning light and the actuation of the balanced signal relay 122 to close the horn relay circuit and energize the horn 22 for informing the operator of brake failure.

Another embodiment of the invention is illustrated in FIGURE 6, which also employs the hydraulic balanced brake signal switch 20 as in the preferred embodiment of FIGURE 1. In this embodiment, the horn warning circuit is not shown, but it is understood that the horn warning circuit is to be connected to the conductor 24 of the balancing switch 20 in the same manner as shown in FIGURE 1. Also, the front and rear brake systems will be respectively connected to the conduits 30a and 31a.

This embodiment differs in providing a separate warning light to indicate the failure of the front or rear brake system. The front dash warning light 135 will be energized upon the closing of hydraulic switch 32, while a rear dash warning light 136 will be energized upon the closing of the hydraulic switch 33. A pair of tail lights 137, 137 is provided which will be energized upon the closing of hydraulic switch 33. All of the lights are connected to the battery through the ignition switch 138, thereby precluding burning of any of the lights when the ignition switch is in its off position. The operation of the balancing switch 20 is of course identical with the embodiment of FIGURE 1.

Referring now to FIGURE 7 another embodiment of the invention is shown which differs from the embodiment of FIGURE 5 only in employing mechanical switches in place of the hydraulic switches 32 and 33. In this embodiment, a mechanical switch 140 is housed in association with one of the front wheel brake assemblies, while a similar mechanical switch 141 is mounted in association with one of the rear brake wheel assemblies 31. The switch 140 takes the place of hydraulic switch 32, while the switch 141 takes the place of hydraulic switch 33. The mechanical switches are normally closed and open circuit when the brakes are not applied. Each switch is respectively provided with an overtravel spring 140a and 141a which engages an abutment on one of the brake shoes of the corresponding brake wheel assembly.

When the brakes are normally applied, the shoes of the brake assembly move outwardly and allow the corresponding switches to close. Failure of either switch to close will cause the electrical signal balanced relay 122 to function and close the horn relay circuit to energize the horn. The operator will then know that either the front or rear brake system has failed, and by glancing at the warning lights 121 and 127 determine which brake system is not functioning properly.

It will be understood that modifications and variations may be effected without departing from the scope of the novel concepts of the present invention, but it is understood that this application is to be limited only by the scope of the appended claims.

We claim as our invention:

1. In a fluid pressure braking system for a vehicle having front and rear wheel brakes, a plurality of hydraulic lines each connected to a separate wheel brake, and a master cylinder having dual pressure chambers, a hydraulic line interconnected with one of said chambers and the hydraulic lines connected with said front wheel brakes, a hydraulic line interconnected with the other of said chambers and the hydraulic lines connected with said rear wheel brakes, a hydraulic stop light switch connected to a source of electrical energy and arranged in each hydraulic line communicating with said dual chambers and said wheel brake lines, a dual stop light housing with dual stop light bulbs therein connected to each of the hydraulic switches, whereupon failure of one of the hydraulic switches due to unbalanced pressure between the front and rear wheel brake lines will not impair stop light function of at least two stop light bulbs, a single hydraulic differential pressure responsive switch communicating with both of the hydraulic lines leaving said dual pressure chambers and connected with said wheel brake lines, said switch comprising a housing having a longitudinal bore therein, a movable piston in said bore, a pair of diaphragms in intimate contact with the opposite ends of said pistons, openings in said housing for communicating said diaphragms with the two hydraulic lines connected with said chambers arranged to subject one diaphragm to pressure from one of said hydraulic lines connected with one of the chambers and the other diaphragm to the pressure from the other hydraulic line connected with the other chamber, a warning means carried by the vehicle electrically connected to said warning means and carrying a contact that closes to energize said warning means upon the movement of said piston precipitated by a predetermined unbalanced pressure condition existing between the front and rear wheel brake lines and subjected to the opposite diaphragms.

2. In a fluid pressure braking system for a vehicle having front and rear wheel brakes, a plurality of hydraulic lines each connected to a separate wheel brake, and a master cylinder having dual pressure chambers, a hydraulic line interconnected with one of said chambers and the hydraulic lines connected with said front wheel brakes, a hydraulic line interconnected with the other of said chambers and the hydraulic lines connected with said rear wheel brakes, a hydraulic stop light switch connected to a source of electrical energy and arranged in each hydraulic lines communicating with said dual chambers and said wheel brake line, a dual stop light housing with dual stop light bulbs therein connected to each of the hydraulic switches, whereupon failure of one of the hydraulic switches due to unbalanced pressure between the front and rear wheel brake lines will not impair stop light function of at least two stop light bulbs, a single hydraulic differential pressure responsive switch communicating with both of the hydraulic lines leaving said dual pressure chambers and connected with said wheel brake lines, said switch comprising a housing having a longitudinal bore therein, a movable piston in said bore, a pair of parallel spaced diaphragms in said bore, said diaphragms in intimate contact with the opposite ends of said pistons, openings in said housing for communicating said diaphragms with the two hydraulic lines connected with said chambers arranged to subject one diaphragm to pressure from one of said hydraulic lines connected with one of the chambers and the other diaphragm to the pressure from the other hydraulic line connected with the other chamber, a warning means carried by the vehicle electrically connected to said warning means and carrying a contact that closes to energize said warning means upon the movement of said piston precipitated by a predetermined unbalanced pressure condition existing between the front and rear wheel brake lines and subjected to the opposite diaphragms.

References Cited in the file of this patent

UNITED STATES PATENTS

| | | |
|---|---|---|
| 1,695,092 | Geiger | Dec. 11, 1928 |
| 2,046,316 | Bentz | July 7, 1936 |
| 2,085,173 | Stanbury | June 29, 1937 |
| 2,174,615 | Bowen et al. | Oct. 3, 1939 |
| 2,200,551 | Hinckley | May 14, 1940 |
| 2,251,615 | Miehle | Aug. 5, 1941 |
| 2,332,301 | Cox | Oct. 19, 1943 |
| 2,353,304 | Green | July 11, 1944 |
| 2,459,938 | Higgins | Jan. 25, 1949 |
| 2,610,238 | Joksch | Sept. 9, 1952 |
| 2,693,588 | Dawley | Nov. 2, 1954 |
| 2,694,191 | Falanga et al. | Nov. 9, 1954 |
| 2,779,013 | Chotro | Jan. 22, 1957 |